United States Patent

Zuk

[15] 3,675,144

[45] July 4, 1972

[54] TRANSMISSION GATE AND BIASING CIRCUITS

[72] Inventor: Borys Zuk, Somerville, N.J.

[73] Assignee: RCA Corporation

[22] Filed: Sept. 4, 1969

[21] Appl. No.: 855,167

[52] U.S. Cl. ........................................330/40, 330/35

[51] Int. Cl. ........................................H03f 3/04

[58] Field of Search ........................................330/37, 35, 51, 40

[56] References Cited

UNITED STATES PATENTS

| | | | |
|---|---|---|---|
| 3,173,101 | 3/1965 | Stelmak | 330/37 |
| 3,230,398 | 1/1966 | Evans et al. | 330/35 UX |
| 3,292,013 | 12/1966 | Golshvy | 330/35 UX |
| 3,443,122 | 5/1969 | Bowers, Jr. | 330/35 X |

*Primary Examiner*—Nathan Kaufman

*Attorney*—H. Christoffersen

[57] ABSTRACT

A single transistor transmission gate coupled at the output end of its conduction channel to a circuit input terminal. When operating in the following mode, the undesired effect of the offset voltage which develops at said output end of said channel, due to the threshold voltage of the transmission gate, is counteracted by reverse biasing, the circuit being driven by a voltage similar to the offset voltage. Shift register employing this circuit and means for changing one of the levels of the output voltage produced by this circuit are also described.

26 Claims, 7 Drawing Figures

INVENTOR.
Borys Zuk
BY H. Christoffersen
ATTORNEY

INVENTOR.
Borys Zuk
BY H. Christoffersen
ATTORNEY

INVENTOR
Borys Zuk
BY H. Christoffersen
ATTORNEY

TRANSMISSION GATE AND BIASING CIRCUITS

BACKGROUND OF THE INVENTION

The minimization of the number of components per function is one of the primary goals of circuit design. In integrated circuit technology this is especially important as it allows more circuit functions to be performed in a given chip area and this in turn permits the fabrication of more complex integrated circuits with better yields.

Thus, from the viewpoint of component usage, a single transistor transmission gate is ideally suited to selectively transmit and/or couple signals between circuit stages and from one circuit to another. However, in using a single transistor transmission gate a problem arises due to the change in the character of the transistor as a function of the information being transmitted. The gating transistor operates in the grounded mode—i.e., common source or common emitter—for one value of input signal and in the follower mode—i.e., as a source follower or emitter follower—for another value of input signal.

In the follower mode, the voltage transmitted to the receiving point does not reach the full value of the sending voltage because of the threshold characteristic of the gating transistor. Depending upon the value of the threshold voltage ($V_T$) of the transmission gate transistor, the voltage actually transmitted to the receiving point may be insufficient to either trigger or turn off a circuit or element connected at the receiving point.

Various solutions have been suggested to overcome the problem due to the threshold voltage ($V_T$) of the single transistor transmission gate transistor. One suggestion is that two transistors be used per transmission gate, while another suggestion is that the transmission gate be overdriven by pulses having an amplitude equal to at least the sum of the signal and threshold voltage. Where the minimization of the number of components per function is of utmost importantce, it would be advantageous not to have to use two transistors per gate. Overdriving the gate transistor, is not feasible in all instances and, in practice may require more than one power supply to generate control signals of large amplitude. Moreover, overdriving increases the power consumption and the noise level in the circuit and these are serious disadvantages.

An object of the present invention is to provide a solution to the problem above which requires only a single transmission gate transistor and which avoids the problems which arise when overdrive is employed.

Another object of the invention is to provide new and improved circuits employing single transistor transmission gates.

Another object of this invention is to provide an improved voltage restoring circuit especially suitable for use with the single transistor transmission gate circuit of the present application.

SUMMARY OF THE INVENTION

An amplifying device having first and second electrodes and which is responsive to a potential of greater than a given value applied between said electrodes. A single transistor transmission gate and a biasing means are coupled respectively to the first and second electrodes of the amplifying device. The biasing means produces a voltage whose amplitude is substantially equal to the threshold voltage of the transmission gate transistor and which is applied in a direction to minimize the potential difference across said first and second electrodes due to the threshold voltage of said gating transistor. .

BRIEF DESCRIPTION OF THE DRAWINGS

In the accompanying drawings like reference characters denote like components, and.

DETAILED DESCRIPTION

For ease of presentation, insulated gate field-effect transistors (IGFETS) of the enhancement type are used in the figures to illustrate the invention. However, it is to be understood that any of the known types of transistors—e.g., depletion type IGFETS, bipolar transistors, or junction field-effect devices—may be used to practice the invention. The introductory discussion below of the transistors illustrated in the various figures is for the purpose of assisting the reader more easily to follow the detailed description of the circuits.

1. The devices used have a first electrode and a second electrode referred to as the source and drain defining the ends of a conduction path, and a control electrode (gate) whose applied potential determines the conductivity of the conduction path. For the P-type IGFET the source electrode is defined as that electrode of the first and second electrodes having the highest potential applied thereto. For an N-type IGFET, the source electrode is defined as that electrode of the first and second electrodes having the lowest potential applied thereto.
2. The devices used are bidirectional in the sense that when an enabling signal is applied to the control electrode, current can flow in either direction in the conduction path defined by the first and second electrodes.
3. For conduction to occur, the applied gate-to-source potential ($V_{GS}$) must be in a direction to forward bias the gate with respect to the source and must be greater in magnitude than a given value which is defined as the threshold voltage ($V_T$). Thus, where the applied $V_{GS}$ is in a direction to forward bias the transistor but is lower in amplitude than $V_T$ the transistor remains cut off and there is substantially no current flow in the conduction channel. [Note that this is also applicable to bipolar devices, where for conduction to occur the base must be forward biased with respect to the emitter by a larger signal than the base-to-emitter junction voltage ($V_{be}$) ].
4. When used as a source (or emitter) follower, the voltage at the source electrode ($V_S$) "follows" the signal applied at the gate ($V_G$) but is offset with respect to the gate by a voltage whose amplitude is equal to the threshold voltage ($V_T$) of the device, [$V_X = V_S - V_T$]. It is this $V_T$ offset which creates a basic problem when using a single transistor transmission gate.

Figure 1A:
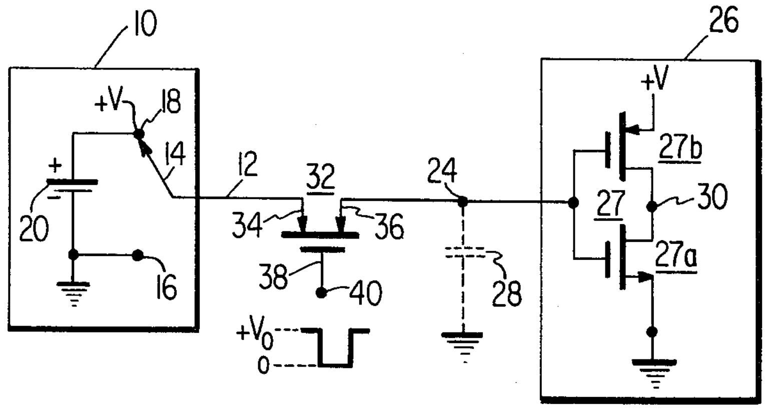
Fig. 1A. PRIOR ART
FIGS. 1A & 1B are schematic diagrams of prior art transmission gate circuits.

The problem solved by the invention is best understood by first referring to FIG. 1 which shows a known transmission gate arrangement.

An input or sending source, represented by box 10 produces signals at its output terminal 12 by means of a switch 14 having a switch arm which may be connected either to a terminal 16 or to a terminal 18. Terminal 16 is connected directly to ground, and terminal 18 is connected to the positive terminal of a battery 20, the negative terminal of the battery being grounded. Depending upon the setting of the switch arm, the signal at sending point 12, may be a voltage level of either ground potential or +V volts, where +V is the value of the potential of battery 20. It is desired to transmit the voltage appearing at sending point 12 selectively to a receiving terminal 24. A load 26 whose input impedance includes a (distributed or discrete) capacitor 28 is connected to the receiving terminal 24. The load 26 is shown, by way of example, to comprise a complementary inverter 27 which includes N-type transistor **27*a* and P-type transistor 27*b*. Transistors 27*a* and 27*b* have their gate electrodes connected in common to output point 30** and their source electrodes to ground and +V respectively.

A transmission gate comprising a P-type field-effect transistor 32 has its conduction path, whose ends are defined by electrodes 34 and 36, connected between sending terminal 12 and receiving terminal 24. The gate electrode 38 of the field-effect transistor is connected to a terminal 40, to which is applied a control signal having a potential of either 0 volts or +V volts. Transistor 32 is biased off (disabled) when its gate voltage is at +V volts, and is (enabled) rendered conducting when the control voltage at gate electrode 38 is lower than the potential at the source electrode by an amount exceeding the $V_T$ of transistor 32.

Let it be assumed that capacitor 28 initially is discharged, that transistor 32 is enabled ($V_G = 0$ volts) and that the movable arm of the switch 14 is connected to terminal 18 (+V volts). For the voltage conditions given, the transistor 32 operates in the common source mode wherein electrode 34 is the source electrode and electrode 36 is the drain electrode. Because the source is at +V volts, a constant potential differential of V volts exists between the source electrode 34 and the gate electrode 38, ($V_{GS} = +V$) and the transistor conduction path remains biased in a low impedance (high conductivity) state so long as the switch and gate voltages remain at these values. Therefore, capacitor 28 is able to fully charge through the conduction path of transistor 32, and the voltage at receiving terminal 24 will go to $+V$ volts. Thus, for this mode of operation of the transmission gate 32, the full voltage at the sending terminal 12 is transmitted to the receiving terminal 24.

Let it now be assumed that the movable switch arm is shifted into contact with terminal 16 and that the gating transistor 32 is either already "on" or is turned "on." The voltage at sending terminal 12 and the control voltage at gate electrode 38 are now set to ground potential, and the initial voltage at electrode 36 is $+V$ volts (capacitor 28 is fully charged). Transistor 32 now operates in the follower mode—as a source follower—with electrode 36 functioning as the source electrode.

When transistor 32 is initially rendered conductive, the voltage at terminal 24 ($V_{24}$) is at $+V$ volts and a differential of V volts exists between source electrode 36 and gate electrode 38. As capacitor 28 discharges, the potential difference between source and gate decreases, causing an increase in the impedance of the conduction channel. When the capacitor 28 is discharged such that $V_{24}$ has a value equal to the $V_T$ of transistor 32 ($V_{T32}$), transistor 32 becomes nonconducting and the capacitor 28 discharges no further (except for leakage current). Thus, with the input grounded, the output remains at a potential level equal to $V_{T32}$.

It has thus been shown that for one direction of conduction of the single transistor transmission gate, the output charges up to the value of the input but that for the other direction the output is offset by the $V_T$ of the gating transistor. The incomplete discharge of the potential at terminal 24 causes transistors 27a and 27b to conduct concurrently as described below.

To highlight the problem, the following typical values are assumed: $+V = 10$ volts; $V_{T32} = T_{T27b} = V_{T(PNP)} = 3$ volts; and, $V_{T27a} = V_{T(NPN)} = 2$ volts. With the input grounded after a $+V$ excursion and with transistor 32 enabled, transistor 27a is still forward biased by a $V_{GS}$ equal to $V_{T32}$ (3 volts) and conducts heavily since its $V_T$ (2 volts) is exceeded. Transistor 27b is also forward biased since its $V_{GS}$ which equals 7 volts ($+V - 3$ volts) exceeds its $V_T$ (3 volts).

Transistors 27a and 27b thus provide a low impedance conduction path between $+V$ and ground which results in a high level of power dissipation. Also, the output level at output 30 is undefined being somewhere between $+V$ volts and ground depending on the conduction level and the impedance ratio of the two conducting transistors.

Thus, coupling inverters by means of a single transistor transmission gates, an ideal circuit combination due to its simplicity, is rendered unsuitable for many applications because of the $V_T$ offset of the gating transistor.

Figure 1B:
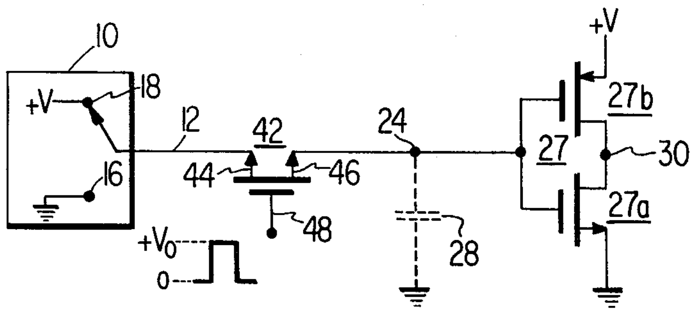
Fig. 1B. PRIOR ART

Replacing P-type gating transistor 32 by N-type transistor 42, as shown in FIG. 1B, results in a similar problem to the one described except that now the receiving terminal cannot be charged up to the $+V$ level of the sending voltage. When transistor 42 is enabled, and the potential at sending terminal 12 is at ground the transistor operates in its common source mode and terminal 24 is discharged to zero potential. However, when transistor 42 is enabled, and the potential at sending terminal 12 is equal to $+V$ electrode 46 of transistor 42 becomes the source electrode and the maximum voltage at terminal 24 ($V_{24MAX}$) is equal to $+V$ minus the threshold voltage of transistor 42 ($V_{T42}$). $V_{24MAX} = [+V - V_{T42}]$, and if in this instance $V_{T42}$ is equal to or greater in magnitude than the $V_T$ of P-type device 27b transistors 27a and 27b conduct concurrently, resulting in excessive power dissipation and in an undefined output.

Figure 2A:
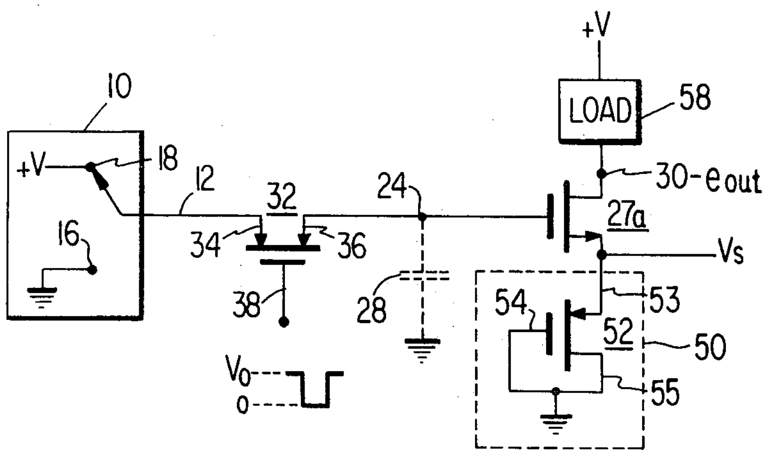
FIGS. 2A & 2B are schematic diagrams of transmission gate circuits embodying the invention.

FIG. 2A illustrates an embodiment of the invention in which the limitations and disadvantages of the single transistor transmission gate are overcome.

The circuit includes an amplifying device—transistor 27a—whose drain is connected through load 58 to $+V$ and whose gate electrode is coupled to one end of the conduction path through transmission gate transistor 32. The input source 10 and gating transistor 32 are connected and perform as in FIG. 1A but, in addition, the source electrode of transistor 27a is connected to self biasing means 50. Biasing means 50 comprises P-type transistor 52 having its source electrode 53 connected to the source electrode of transistor 27a and its gate electrode 54 connected in common with its drain electrode 55 to ground potential. Thus connected, the drain-to-source potential ($V_{DS}$) of transistor 52 is at most equal to its gate-to-source ($V_{GS}$) potential which in turn is equal at most to the threshold voltage ($V_T$) of the transistor. This occurs because as soon as the potential at electrode 53 increases above $V_T$, the transistor conducts more heavily. Thus connected, the transistor provides a bias voltage whose amplitude is equal to the $V_T$ of the device.

The source electrode of transistor 27a is therefore biased at $V_{T52}$ volts above ground potential and in a direction to reverse bias its source electrode (making it relatively more positive), with respect to its gate electrode. Since transistor 52 is of the same conductivity type as transistor 32 and is formed by the same process and in the same manner as transistor 32, $V_{T52}$ should be substantially equal to $V_{T32}$.

When, as described above, the sending potential at terminal 12 is zero volts, transistor 32 conducts in the follower mode and the potential at terminal 24 which is the gate potential of transistor 27a decreases or discharges to a value equal to $V_{T32}$ ($\approx 3$ volts). The voltage at the source electrode of transistor 27a is now maintained at $V_{T52}$ ($\approx 3$ volts). The gate-to-source potential ($V_{GS}$) of transistor 27a is therefore substantially equal to zero and transistor 27a is cut off.

The above is a highly advantageous form of circuit operation. When the circuit input terminal 12 is placed at ground potential, transistor 27a cuts off and the circuit output voltage at terminal 30 rises to a known in advance level whose value is determined by the impedance of the load 58 and not by the characteristics of the conduction path of transistor 27a. Thus, if for example load 58 is resistive or an active device such as transistor 27b the output voltage will be substantially equal to $+V$ volts.

On the other hand, when input terminal 12 is placed at $+V$ volts and transistor 27a is thereby driven into saturation, the output voltage at terminal 30 is clamped to the voltage developed across the biasing circuit 50, that is, to $V_{T52}$ ($\approx +3$ volts). Thus, in response to the two levels of input signal $+V$ and zero, the output voltage swings between a low value of $V_{T52}$ volts and a high value of $+V$ volts. If desired, the voltage offset ($V_{T52}$) may be eliminated and the output signal swing thereby increased to the difference between $+V$ and ground potential in the manner discussed later in connection with FIG. 5.

Figure 2B:
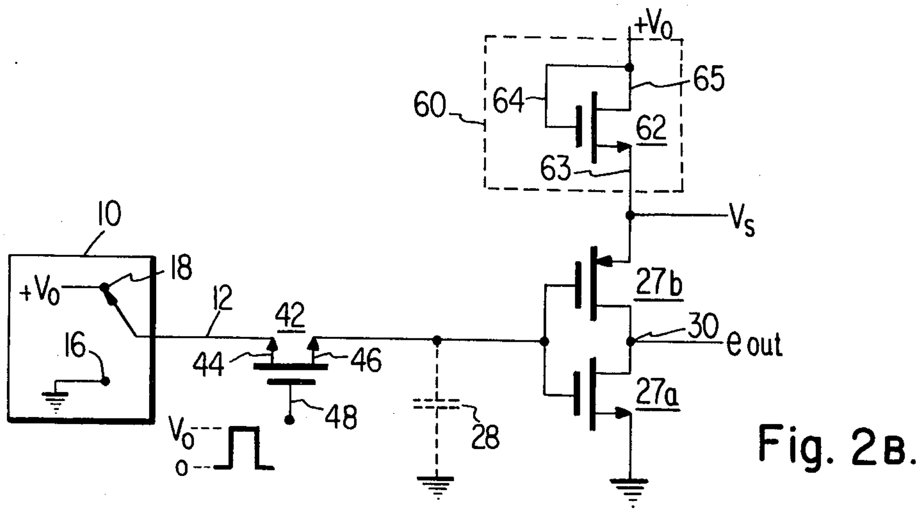

FIG. 2B illustrates an embodiment of the invention analogous to the FIG. 2A circuit but in which N-type devices are used for the gating transistor 42 and for the means 60. When the potential at sending terminal 12 is $+V$ volts, transistor 42, when enabled, operates in the follower mode and $V_{24}$, which is the gate potential of transistors 27a and 27b, is at most equal to $[V - V_{T42}]$. For this signal and voltage condition, it is desired that transistor 27b be cut off.

The biasing means 60 connected to the source of transistor 27b decreases the source potential of transistor 27b by the $V_T$ of transistor 62 ($V_{T62}$). Transistor 62 is an N-type transistor having its gate and drain coupled to $+V$ and its source connected to the source of transistor 27b. Transistor 62 is connected diode-like such that $V_{T62}$ is the voltage across its drain and source electrodes. The source potential ($V_S$) of transistor 27b will thus equal the power supply potential $+V$ minus the $V_T$ drop of transistor 62, $[V_S = +V - V_{T62}]$. Assuming $V_{T42}$ and $V_{T62}$ to be nearly equal, since both are N-type devices and are formed in the same process, $V_{GS}$ of transistor 27b is substantially equal to zero volts and it is definitely cut off. Thus, when the sending potential is $+V$ volts, transistor 27b is cut off, transistor 27a is conducting and the output at terminal 30 is charged to 0 volts.

When the sending potential at terminal 12 is zero volts, transistor 27a is cut off, transistor 27b is conducting and the output at terminal 30 achieves a voltage level equal to $[V - V_{T62}]$.

In the circuits of the present invention, as discussed above, the inability to cut off an amplifier driven by a transmission gate for the "off" input signal condition has been eliminated. In the present circuits, the output levels are well defined functions of the input signal. While any biasing device may be used to neutralize the threshold voltage of the transmission gate, an advantage of using transistors of the same conductivity for the gating and the biasing function is that they have similar characteristics. This implies that the transistor characteristics "track" that is, they change in the same sense, in response to environmental changes such as changes in ambient temperature and the circuit operation is therefore relatively unaffected by such changes.

Figure 3:
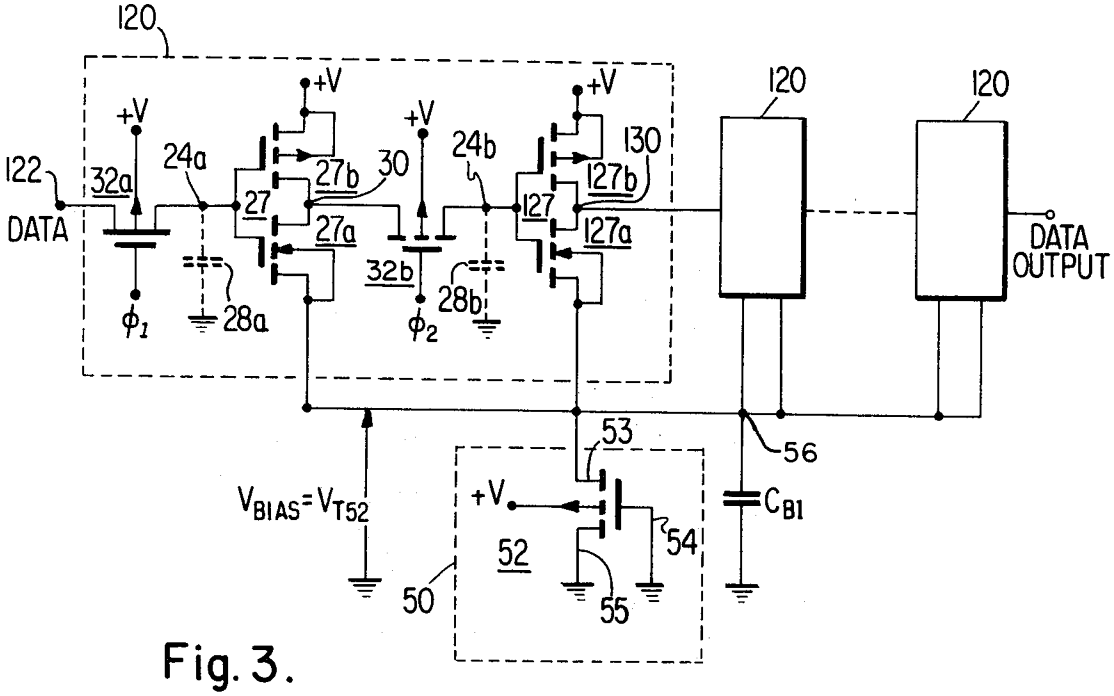
FIG. 3 is a schematic drawing of a shift register embodying the invention.

FIG. 3 shows a shift register having N stages, where N is an integer greater than 1, which employs a single biasing means as taught by the invention. As all stages of the register are identical, the circuit of only one such stage is shown. It includes a transmission gate transistor 32a whose conduction path is connected between input signal node 122 and input terminal 24a of inverter 27. A second transmission gate 32b is similarly connected between the output terminal 30 of inverter 27 and the input terminal 122a of the next stage.

The substrate of the transistors is indicated by an arrow, which for the P-type devices is shown in a direction going away from the body and for N-type devices is shown going toward the body.

The source electrodes of the P-type transistors (27b and 127b) of the inverters are coupled to $+V$ and the source electrodes of transistors 27a and 127a (and all of the other N-type transistors of the inverters of the register) are connected in common to a biasing point (bus line) 56 whose potential is determined by biasing means 50. Biasing means 50 is identical to that shown in FIG. 2A and consists of a transistor 52 having its source-drain path connected between the biasing point 56 and ground potential, its gate electrode connected to ground potential and its substrate connected to $+V$. The source electrode of the N-type transistor of each inverter is maintained at a biasing potential equal to $V_{T52}$. Assuming $V_{T52}$ to be equal to 3 volts, bias point 56 and the source of each N-type device will be maintained at 3 volts.

The gate electrodes of transistors 32a and 32b are respectively coupled to a source of a first and second clock pulses $\phi 1$ and $\phi 2$, respectively, where $\phi 1$ and $\phi 2$ are complementary. For example, when $\phi 1$ is $+V$ volts, $\phi 2$ is at 0 volts and when $\phi 2$ is at $+V$ volts, $\phi 1$ is at 0 volts. This ensures that only one of two adjacent transmission gates of a register stage is enabled at any one time.

In the operation of the shift register, assume first that a data pulse of amplitude $+V$ is applied at terminal 122. If $\phi 1$ is 0 volts, transistor 32a conducts and the input terminal 24a of inverter 27 is charged to $+V$. This cuts off P-type transistor 27b and drives N-type transistor 27a into saturation causing the output signal at terminal 30 to substantially equal the voltage across the bias means 50 ($V_{T52}$). Since $\phi 2$ is $+V$ volts ($\phi 1 = 0$ volts), transistor 32b is off, being reverse biased by the clock pulse, and the inverter 127 remains in its previous state.

The clock pulse $\phi 1$ now goes to $+V$ and $\phi 2$ goes to 0 volts. Transistor 32a is disabled and input node 122 is electrically disconnected from terminal 24a. Inverter 27, however, cannot change state since the input impedance to the inverter is extremely high and capacitance 28a remains charged to $+V$. As a result, the output 30 of inverter 27 remains clamped to $V_{T52}$ volts. With $\phi$ 2 at 0 volts, transistor 32b is enabled and couples the voltage output ($V_{T52}$) at terminal 30 to the input terminal 24b of inverter 127. Transistor 127b is now driven into saturation applying $+V$ to output terminal 130 while transistor 127a is cut-off since the potential applied to its gate ($\approx V_{T52}$) is substantially equal to the potential ($V_{T52}$) applied to its source ($V_{GS} \approx 0$). In a similar manner, on succeeding clock pulses the data pulse first applied to terminal 122 is successively shifted down through the following register stages.

When $\phi 1$ goes to 0 volts again, and, assuming by way of example that the data input is now also grounded, transistor 32a is enabled and operates in the follower mode to discharge capacitor 28a so that $V_{24a}$ eventually equals $V_{T32a}$. This causes inverter 27 to change state. Transistor 27a now is cut off since its $V_{GS}$ is substantially equal to 0 volts and transistor 27b is energized applying $+V$ volts to terminal 30. Transistor 32b is disabled and terminal 24b remains discharged (at $V_{T52}$ volts) and terminal 130 remains clamped to $+V$. The $+V$ signal at terminal 130 is coupled to the next succeeding stage by means of the first transmission gate of the succeeding stage (not shown) controlled by $\phi$ 1 and will be shifted down the stages of the shift register on alternate cycles of the clock pulses.

It has thus been shown that by using a single transistor to establish a bias voltage it is feasible to couple amplifying stages by means of a single transistor transmission gate per stage. The biasing means renders the combination reliable, ensures low power dissipation and eliminates the need for two gating transistors per stage or other complex means to reliably coupled the stages.

In keeping with the discussion of FIG. 2B and in view of the circuit of FIG. 3 it should be obvious that the shift register could comprise complementary inverters coupled by transmission gate transistors of the N-type in conjunction with a biasing means in which the biasing transistor is of the N-type. In such a circuit, the biasing transistor would be connected between the positive source of potential $+V$ and a common source line (common bias line) connected to the source electrodes of the P-type transistors (27b, 127b...) of the complementary inverters.

Figure 4:
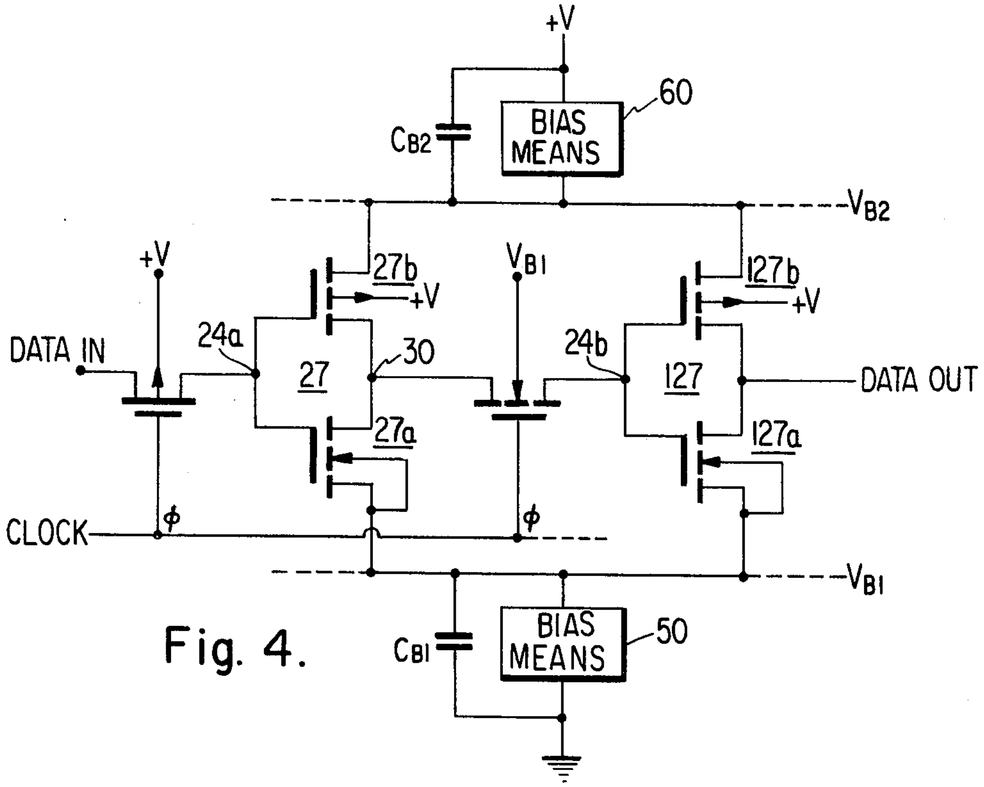
FIG. 4 is a drawing of a shift register using a dual bias arrangement in accordance with the invention.

FIG. 4 shows a shift register with a dual biasing arrangement but requiring only a single phase clock pulse. The conduction path of each inverter is coupled at one end to P-type biasing means 50 and at the other end to N-type biasing means 60. The inverters are coupled by means of single transistor transmission gates, but note that the gating transistors are alternated as to conductivity type. That is, where the first gating transistors is of first conductivity type (P-type) the next is of second conductivity type (N-type) and so on. Using gating transistors of opposite conductivity permits the use of a single clock to progressively shift the data down successive stages. When the clock is $+V$ volts, the N-type gating transistor conducts and the P-type gating transistor is cut off and when the clock is at 0 volts the P-type gating transistor conducts and the N-type gate is cut off. Using P and N conductivity type transistor for the transmission gates necessitate the use of two bias means—one bias means 60 to compensate for the $V_T$ of the N-type transistors and another biasing means 50 to compensate for the $V_T$ of the P-type devices.

Thus, by using a single transistor transmission gate per amplifying stage by alternating the conductivity types of the gating transistors, and by using two bias means of first and second conductivity to bias the amplifying stages a single clock is sufficient to sequence data along a shift register.

Though the invention has been described using circuits in which the biasing means includes a transistor of the same conductivity type as the transmission gate transistor, it should be appreciated that the invention may also be practiced using any biasing means such as Zener diodes or resistive voltage dividers to provide a substantially constant biasing voltage. However, the use of transistors of similar conductivity and type for the biasing and the gating provides enhanced tracking and temperature performance as described above.

Figure 5:
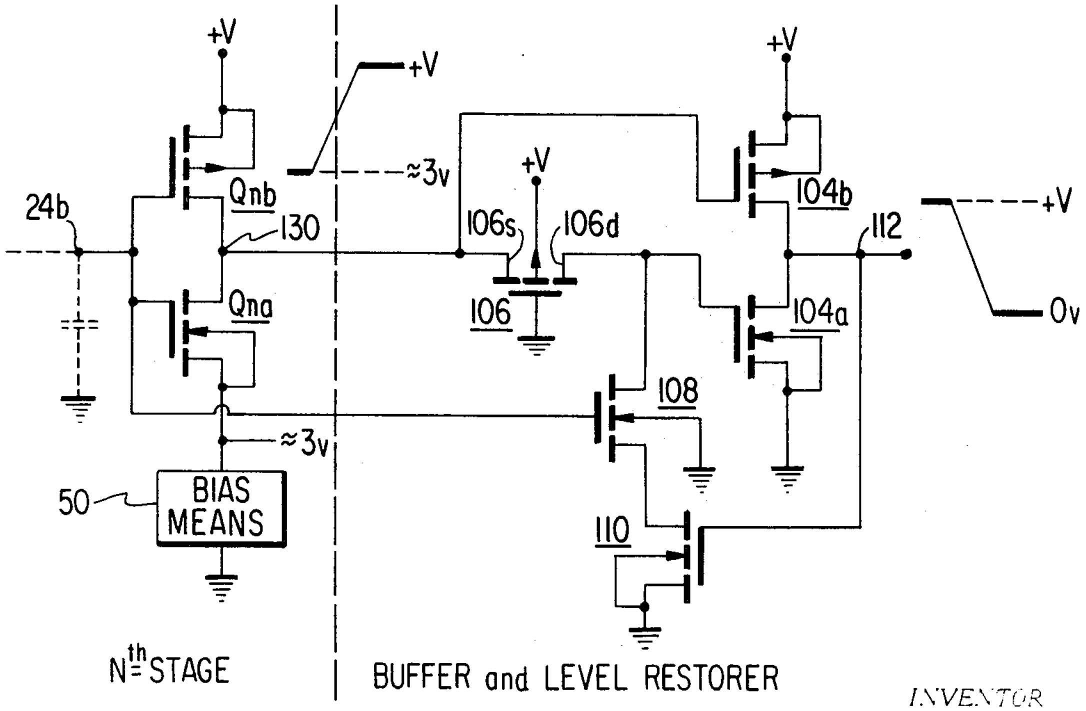
FIG. 5 is a schematic drawing of a level restoring circuit.

FIG. 5 shows a level restorer circuit which functions to restore the full signal amplitude to the "shrunken" signal level at the output of the biased inverters. For illustrative purposes, the circuit of FIG. 5 is used in conjunction with the register described in FIG. 3. The amplitude of the signal is restored to the full potential of the supply source by shifting the three volt level down to ground potential. (Note that for the circuit of FIG. 3 the ten volt level is maintained throughout the circuit operation).

The last stage of the shift register described in FIG. 3 is represented by a complementary inverter comprising transistors Qna and Qnd having their drains connected in common to junction point 130. Junction point 130 is directly connected to the source of P-type transistor 106 which has the other one of its source and drain electrodes connected to the gate of the N-type transistor 104A. Transistor 106 is a transmission gate transistor operated in the common gate configuration, its gate being connected to ground. Transistors **104*a* and 14*b* act as a complementary inverter, though their gates are not connected in common. The gate of transistor 104*a* is also connected to one end of the conduction path of N-type transistor 108 which is connected in series with the conduction path of N-type transistor 110. The gate of transistor 110 is connected to output point 112 which is the common connection of the two drains of transistors 104*a* and 104*b* and the gate of transistor 108 is connected to junction point 24*b*. Transistor 104*b* has its conduction path connected between output point 112 and $+V$ and serves to clamp the output point to $+V$ when a negative going signal is applied to its gate. Transistor 104*a* has its conduction path connected between output point 112** and ground and serves to clamp the output to ground potential when a positive signal is applied to its gate.

When the potential at terminal **24*b* goes low ($V_{TS2} \cong 3$v) the potential at output 130 goes to $+V$ (i.e. the output of the Nth stage is "high") and transistor 104*b* is cut off since its gate and source electrodes are at the same potential ($+V$) and its $V_{GS} = 0$. Transistors Qnb, 106, 108 and 110 form a voltage divider which provides enough drive to the gate of transistor 104*a* to saturate the latter. Transistor 106 whose gate is grounded has $+V$ applied to its source electrode 106s and therefore provides a low impedance path between the gate of 104*a* and terminal 130. Transistor 108 whose gate is at $V_{TS2}$ and transistor 110 whose gate is coupled to output point 112 initially tend to shunt some of the signal to ground but transistor 108 is never driven very hard and as the potential at output 112 decreases, transistor 110 starts to cut off which causes transistor 104*a* to be driven on harder further cutting off transistor 110**. Thus, whereas transistors Q*nb* and 106 provide a low impedance conduction path between the gate of **14*a* and $+V$, transistors 108 and 110 provide a high impedance conduction path between the gate of transistor 104*a* and ground. The high signal at terminal 130 is thus transformed into a signal at output point 112** which is solidly clamped to ground. This signal is thus suitable to drive any normal load.

When the potential at terminal **24*b* goes high ($+V$) the output 130 of the Nth stage goes "low" ($V_{TS2}$) which for ease of illustration is assumed to be 3 volts. Transistor 104*b* is forward biased and driven into saturation causing the output at 112 to start rising to $+V$. It remains to be shown that transistor 104*a*** is quickly cut-off under these conditions.

When the potential at terminal 130 first goes low (3 volts) the gate of transistor **104*a* may be charged up to $+V$ volts. Note that now $+V$ volts are applied to electrode 106*d* and +3 volts to electrode 106*s*. Electrode 106*d* now becomes the source of grounded gate transistor 106 which now behaves as a source follower and conducts in a direction to discharge the potential on the gate of transistor 104*a* to the +3 volt level of terminal 130. When the potential at the gate of 104*a* reaches the $V_T$ of transistor 106, the latter cuts-off effectively disconnecting transistor 104*a* from the bias circuit thereby permitting transistor 108 and 110 to clamp the gate of transistor 104*a*** to ground.

While transistor 106 provides the initial discharge of the charge on the gate of transistor **104*a* it should be noted that transistors 108 and 110 serve to clamp the gate of 104*a* to ground. Since the potential at 24*b* is $+V$ transistor 108 is driven on very hard and as soon as the potential at output point 112 starts to rise transistor 110 is driven on harder such that the conduction paths of transistors 108 and 110 provide a lower and lower impedance path between the gate of transistor 104*a* and ground. The low signal at terminal 130 is thus transferred into a signal at output point 112** which is solidly clamped to $+V$ and thus highly capable of driving any normal load.

Using five transistors the signals which had been propagated at a reduced level are restored to the full amplitude of the supply source and are well adapted to drive any external load.

It has thus been shown that systems using a biasing scheme in conjunction with a single transistor transmission gate are feasible and that the output of such systems may be restored to the full amplitude of the power supply system.

What is claimed is:

1. The combination comprising:

amplifying means, having first and second input terminals and an output terminal, said amplifying means being responsive to a potential applied between said first and second input terminals for producing a signal at said output terminal;

single transistor transmission gate means connected between an input signal point and said first input terminal for coupling an input signal to said first input terminal, said transistor transmission gate means having a threshold voltage and operating in one direction of conduction in the follower mode, whereby the signal transmitted in that mode is offset from the input signal by an amount substantially equal to the threshold voltage of said transmission gate means transistor; and substantially constant reverse biasing means coupled to said second input terminal, for applying a bias voltage thereto substantially equal in magnitude to the threshold voltage of said transistor transmission gate means and poled in a direction to reduce the potential difference across said first and second input terminals due to the threshold voltage of said transmission gate means.

2. The combination as claimed in claim 1 wherein said biasing means comprises a single transistor having a threshold voltage for developing said bias voltage at said second input terminal.

3. The combination comprising:

amplifying means, having first and second input terminals and an output terminal, said amplifying means being responsive to a potential applied between said first and second input terminals for producing a signal at said output terminal;

transmission gate means comprising a single insulated gate field-effect transistor having a source and a drain electrode defining the ends of a conduction path and a control electrode; said transistor being connected at one end of its conduction path to said first input terminal and at its other end to a signal input point for coupling an input signal to said first input terminal, said transmission gate means transistor having a threshold voltage and operating in one direction of conduction in the follower mode, whereby the signal transmitted in that mode is offset from the input signal by an amount substantially equal to the threshold voltage of said transmission gate means transistor; and substantially constant reverse biasing means comprising a single insulated gate field-effect transistor having a source and a drain electrode defining the ends of a conduction path and a control electrode, said biasing means transistor having a threshold voltage and having one end of its conduction path connected to said second input terminal and the other end of its conduction path connected to its control electrode, for applying a bias voltage to said second input terminal substantially equal in magnitude to the threshold voltage of said transmission gate means transistor and poled in a direction to reduce the potential difference across said first and second input terminals due to the threshold voltage of said transmission gate means.

4. The combination as claimed in claim 3 wherein said amplifying means includes a transistor having a control electrode an input electrode and an output electrode; and wherein said control electrode is said first input terminal of said amplifying means said input electrode is said second input terminal of said amplifying means, and said output electrode is coupled to said output terminal of said amplifying means.

5. The combination comprising:

first and second terminals and input signal node;

first and second transistors of one conductivity type and a third transistor of a second conductivity type, each transistor having a control electrode and first and second electrodes defining the ends of a conduction path;

means coupling the conduction path of said first transistor between said input signal node and the control electrode of said third transistor;

means coupling the second electrode and the control electrode of said second transistor in common to said first terminal;

output load means coupling the second electrode of said third transistor to said second terminal; and means coupling the first electrode of said second transistor to the first electrode of said third transistor.

6. The combination as claimed in claim 5 wherein said first, second and third transistors are insulated gate field-effect transistors.

7. The combination as claimed in claim 6 wherein said first electrode is the source electrode, said second electrode is the drain electrode and said control electrode is the gate electrode.

8. The combination as claimed in claim 7 further providing:

a source of potential applied between said first and second terminals;

means for alternately enabling and disabling said first transistor; and means for applying input signals to said input signal node.

9. The combination as claimed in claim 8 wherein said output load means includes at least one active device such as another transistor.

10. In combination with a semiconductor amplifying device having input, control, and output terminals, one of said input and control terminals being coupled to one end of the conduction path of a transmission gate transistor having a threshold voltage, the other end of the conduction path of said transistor being connected to an input signal point, whereby for one condition of conduction the input signal transmitted to one of said input and control terminals is offset by the value of said threshold voltage, the improvement comprising:

substantially constant, reverse biasing means coupled to the other one of said input and control terminals, comprising means for applying a bias voltage to the electrode to which it is coupled, having a magnitude approximately equal to said threshold voltage and of a polarity to cancel the effect of said threshold voltage.

11. A shift register comprising:

a plurality of inverters, each inverter having an input and an output and each inverter including one transistor of first conductivity type;

a plurality of transistors of second conducting type, each transistor coupling a different one of said outputs to a different one of said inputs of said inverters;

first and second junction points;

means coupling one end of the conduction path of each said transistor of first conductivity type in common to said first junction point; and a biasing transistor of said second conductivity type having a control electrode and first and second electrodes defining the ends of a conduction path, one end of said conduction path being connected to said first junction point and the other end of said conduction path being connected to said second junction point the control electrode of said biasing transistor being connected to said second junction point in a direction to forward bias said biasing transistor.

12. The combination as claimed in claim 11 wherein said inverters are of the complementary type and each inverter further includes a second transistor of second conductivity type.

13. The combination as claimed in claim 11 further providing first and second source of clock pulses, wherein said first and second clock pulses are complementary to each other and wherein said first clock is applied to every other transistor coupling the inverters and wherein said second clock is applied to the remaining transistors coupling the inverters, such that no two adjacent coupling transistors have the same clock pulse applied to them.

14. The combination as claimed in claim 11 further providing a first power terminal and a potential source for applying a potential between said first power terminal and said second function point, and further providing means for coupling the other end of the conduction path of said inverters to said first power terminal.

15. A level restoring circuit comprising:

first and second inverters, each inverter having an input and an output and a conduction path;

first and second power terminal for the application thereto of a source of potential;

a bias point having a potential value intermediate the potential applied between said two terminals;

means coupling the conduction path of said first inverter between said bias point and one of said terminals;

means coupling the conduction path of said second inverter between said first and second power terminals; and level shift means including a common gate transistor coupling the output of said first inverter to the input of said second inverter.

16. The combination as claimed in claim 15 wherein said second inverter is a complementary inverter having one transistor of first conductivity type and a second transistor of second conductivity type, each transistor having first and second electrodes defining the ends of a conduction path and a control electrode, the first electrode of each transistor being coupled to a different one of said terminals and the second electrode being connected in common to the inverter output;

wherein the control electrode of said one transistor is directly coupled to the output of said first inverter; and wherein the control electrode of said second transistor is connected to one end of the conduction path of said common gate transistor.

17. The combination as claimed in claim 16 further providing third and fourth transistors, each transistor having first and second electrodes defining the ends of a conduction path and a control electrode;

wherein the conduction paths of said third and fourth transistors are connected in series between the control electrode of said second transistor and said second terminal; and wherein the control electrode of said third transistor is coupled to the input of said first inverter and the control electrode of said fourth transistor is coupled to the output of said second inverter.

18. The combination comprising:

first and second terminals for the application thereto of an operating potential.
first and second inverters, each inverter having an input and an output and a conduction path;
a biasing means;
means coupling the conduction path of said first inverter in series with said bias means between said first and second terminals;
means coupling said second inverter between said first and second terminals;
first transistor of one conductivity type and second and third transistors of second conductivity type, each transistor having first and second electrodes defining the ends of a conduction path and a control electrode;
means coupling the conduction path of said first transistor between the output of said first inverter and the input of said second inverter;
means coupling the conduction path of said second and third transistors in series between the input of said second inverter and the second terminal; and
means coupling the control electrode of said second transistor to the input of said first inverter and the control electrode of said third transistor to the output of said second inverter.

19. The combination as claimed in claim 18 further providing means coupling the control electrode of said first transistor to one of said first and second terminals.

20. The combination as claimed in claim 19 wherein said bias means includes a fourth transistor of said one conductivity type, the conduction path of said fourth transistor being connected between the conduction path of said first inverter and said second terminal; and, wherein the control electrode of said fourth transistor is connected to said second terminal in a direction to forward bias said fourth transistor.

21. The combination of:
a circuit which includes a single transistor transmission gate having a conduction path through which current is conducted in either direction and which, when its path conducts in one direction, develops at the output end of said path an offset voltage equal to the threshold voltage of the transmission gate; and
a circuit connected to said output end of said conduction path which it is desired to drive to cut off when the transmission gate is operating in said one direction, said circuit including:
an active element having a control electrode and a path extending between two other electrodes whose conductivity is controlled by said control electrode, said control electrode being connected to said output end of said conduction path of said transmission gate; and
a bias circuit connected in series with said path through said active element for developing a reverse bias voltage approximately equal to said offset voltage, during conduction of more than a given amount of current through said path through said active element, to thereby reduce the voltage swing at said control electrode required to switch said active element from its conducting to its cut-off condition.

22. The combination as set forth in claim 21 wherein said bias circuit and said transmission gate each comprise field effect transistors of the same conductivity type and said bias circuit transistor is connected at its control electrode to its drain electrode and with its source-to-drain path in series with the path through said active element.

23. The combination as claimed in claim 4 wherein said amplifying means transistor is an insulated gate field-effect transistor of first conductivity type having gate, drain and source electrodes; wherein said gate electrode is said first electrode, said source electrode is said second electrode, and said drain electrode comprises the output electrode of said amplifying means; and
wherein said transmission gate and biasing means transistors are of a second conductivity type.

24. The combination as claimed in claim 23 further including first and second power terminals for the application therebetween of a source of operating potential;
further including output load means connected between the drain electrode of said amplifying means transistor and said first power terminal;
wherein said biasing means transistor has its source connected to said second power terminal; and
wherein said biasing means transistor has its drain and gate electrodes connected to the source of said amplifying means transistor.

25. The combination as claimed in claim 24 wherein said output load means includes an additional insulated gate field-effect transistor of said second conductivity type, said transistor having a source, a drain, and a gate electrode;
wherein the gate electrode of said additional transistor is connected in common to the gate of said amplifying transistor at one end of the conduction path of said transmission gate transistor;
wherein the source electrode of said additional transistor is connected to said first power terminal; and
wherein the drain electrode of said additional transistor is connected to the drain of said amplifying means transistor.

26. The combination comprising:
a plurality of amplifying means, each having first and second input terminals and an output terminal, each one of said amplifying means being responsive to a potential applied between said first and second input terminals for producing a signal at said output terminal;
a plurality of single transistor transmission gate means, each coupled between an input signal point and the first input terminal of a different one of said amplifying means, said transmission gate means transistor having a threshold voltage and operating in one direction of conduction in the follower mode whereby the signal transmitted in that mode to said first input terminal is offset from the input signal by an amount substantially equal to the threshold voltage of said transmission gate transistor; and
a biasing means coupled in common to all the second input terminals of said plurality of amplifying means, said biasing means having a bias voltage substantially equal in magnitude to the threshold voltage of said gating transistors and applied in a direction to reduce the potential difference across said first and second input terminals of said amplifying means due to the threshold voltage of said transmission gate transistors.

* * * * *

UNITED STATES PATENT OFFICE
CERTIFICATE OF CORRECTION

Patent No. 3,675,144 Dated July 4, 1972

Inventor(s) Borys Zuk

It is certified that error appears in the above-identified patent and that said Letters Patent are hereby corrected as shown below:

Column 2 line 47 change "$[V_X = V_S - V_T]$" to --- $[V_S = V_G - V_T]$---.

Column 3 line 56 change "$T_{T27b}$" to ---$V_{T27b}$---.

Column 7 line 23 change "Qnd" to ---Qnb---.

line 31 change "14B" to ---104B---.

line 62 change "14a" to ---104a---.

Signed and sealed this 9th day of January 1973.

(SEAL)
Attest:

EDWARD M.FLETCHER,JR.
Attesting Officer

ROBERT GOTTSCHALK
Commissioner of Patents